United States Patent [19]

Alasafi et al.

[11] Patent Number: 5,493,921

[45] Date of Patent: Feb. 27, 1996

[54] SENSOR FOR NON-CONTACT TORQUE MEASUREMENT ON A SHAFT AS WELL AS A MEASUREMENT LAYER FOR SUCH A SENSOR

[75] Inventors: Kaldoun Alasafi, Schwaebisch Gmuend; Horst Buehl, Weinstadt; Ralf Gutoehrlein, Fellbach; Edmund Schiessle, Schorndorf, all of Germany

[73] Assignee: Daimler-Benz AG, Germany

[21] Appl. No.: 314,712

[22] Filed: Sep. 29, 1994

[30] Foreign Application Priority Data

Sep. 29, 1993 [DE] Germany .......................... 43 33 199.8

[51] Int. Cl.⁶ ......................................................... G01L 3/02
[52] U.S. Cl. .............................. 73/862.336; 73/862.335; 73/118.1
[58] Field of Search ....................... 73/862.336, 862.333, 73/862.335, 862.191, 862.193, DIG. 2, 116, 118.1; 324/207.21, 209; 74/862, 857

[56] References Cited

U.S. PATENT DOCUMENTS

| | | | |
|---|---|---|---|
| 4,697,460 | 10/1987 | Sugiyama et al. | 73/862.333 |
| 4,817,444 | 4/1989 | Yagi et al. | 73/862.335 |
| 4,887,461 | 12/1989 | Sugimoto et al. | 73/118.1 |
| 4,962,672 | 10/1990 | Yagi et al. | 73/862.335 |
| 5,255,567 | 10/1993 | Miyake et al. | 73/862.335 X |
| 5,307,691 | 5/1994 | Miyake et al. | 73/862.335 X |
| 5,353,649 | 10/1994 | Hase et al. | 73/862.335 |

FOREIGN PATENT DOCUMENTS

| | | |
|---|---|---|
| 0285259A2 | 10/1988 | European Pat. Off. . |
| 0285260B1 | 10/1988 | European Pat. Off. . |
| 1900194 | 7/1970 | Germany . |
| 3319449A1 | 11/1984 | Germany . |
| 3407917A1 | 9/1985 | Germany . |
| 3635207C2 | 4/1988 | Germany . |

Primary Examiner—Richard Chilcot
Assistant Examiner—Elizabeth L. Dougherty
Attorney, Agent, or Firm—Evenson, McKeown, Edwards & Lenahan

[57] ABSTRACT

A Sensor for non-contact torque measurement on a shaft and a soft-magnetic, magnetostrictive measurement layer, especially for such a sensor. The sensor contains a measurement layer support having a soft-magnetic and magnetostrictive measurement layer which is a tubular shaft intermediate piece, as well as a measurement coil support having a measurement coil which is opposite the measurement layer. The measurement coil support is fixable on a holder without being supported on the measurement layer support, and that end region of the measurement layer support which faces away from the shaft is essentially in the form of a disc and is constructed such that it extends essentially at right angles to the shaft axis when the measurement layer support is fitted. This sensor, which can be fitted and removed easily, has a short axial structural length. A measurement layer is provided having a chemical composition that contains the main component nickel and minority components of phosphorus, a transition metal and an element in the main group IV or V, as well as, preferably, saccharin.

5 Claims, 2 Drawing Sheets

SENSOR FOR NON-CONTACT TORQUE MEASUREMENT ON A SHAFT AS WELL AS A MEASUREMENT LAYER FOR SUCH A SENSOR

BACKGROUND AND SUMMARY OF THE INVENTION

The present invention relates to a sensor for non-contact torque measurement on a shaft having a measurement layer support, which has a first end region for torque-coupled fixing on a shaft, and a second end region which is an annular disc and extends essentially at right angles to an axis of the shaft when the measurement layer support is fitted, a downstream element and a cylindrical surface being torque-coupled fixed between the first and second end regions, on which cylindrical surface a soft-magnetic and magnetostrictive measurement layer is arranged which is coaxial with respect to the shaft when the measurement layer support is fitted, and a measurement coil support, fitted with a measurement coil that produces an electrical output signal as a function of a mechanical stress state of the measurement layer, the measurement coil being coaxially opposite the surface of the measurement layer. The invention also relates to a soft-magnetic, magnetostrictive measurement layer which can be used for this sensor.

A sensor of the above-described type is disclosed, for example, in European Patent Document 0 285 259 B1. The measurement layer support in that sensor consists of a specially constructed tubular measurement shaft piece whose end regions can be fixed on associated shaft ends of the shaft, which is cut through for this purpose. The measurement coil support is fitted with an excitation coil to which alternating current is applied and a detector coil, which detects the torque-dependent permeability changes in the measurement layer and is supported by a ball bearing on a region of the measurement layer support which extends axially between the region occupied by the measurement layer and the associated end region, which forms a radially projecting annular flange.

German Patent Document 36 35 207 C2 discloses a sensor for non contact torque measurement on a shaft, in the case of which the measurement layer is part of a layer sequence arranged firmly on the shaft and is magnetically excited by a permanent magnet. Provided as the measurement arrangement is a U-shaped support which is composed of a magnetic, non-magnetostrictive metal and whose web is fitted with a measurement coil so that the permeability changes induced in the measurement layer by the changes in the torque are detected as changes in the inductance of the measurement coil which, for this purpose, is looped into a circuit which detects its inductance. The measurement layer which is used consists mainly of nickel, a specific component of phosphorus being added in order to control the magnetic properties of the layer.

German Patent Document 34 07 917 A1 specifies as the material for the measurement layer of a torque sensor a material whose chemical composition is $M_y X_{100-y}$, M being at least one of the metals iron, cobalt and nickel, X being at least one of the elements boron, carbon, silicon and phosphorus and, furthermore, y being between approximately 70% and 90%. In this case, in addition to the metals, a component of up to 4% by atomic weight of at least one of the metals chromium, molybdenum, tungsten, vanadium, niobium, tantalum, titanium, zircon, hafnium and manganese can be provided in addition to the metals and, moreover, the elements aluminum, gallium, indium, germanium, tin, lead, arsenic, antimony, bismuth or beryllium can be provided in addition to or instead of the individual components X. Alloys having a majority component of cobalt are recommended there as being preferred.

An object of the present invention is to provide a sensor for non-contact torque measurement on a shaft having a structurally simple, robust and physically small structure which, in particular, also allows the measurement coil to be replaced easily, and a measurement layer which is suitable for such a sensor.

This and other objects are achieved by the present invention which provides a sensor for non-contact torque measurement on a shaft comprising a measurement layer support, which has a first end region for torque-coupled fixing on a shaft, and a second end region which is an annular disc and extends essentially at right angles to an axis of the shaft when the measurement layer support is fitted. A downstream element and a cylindrical surface are torque-coupled fixed between the first and second end regions. On the cylindrical surface a soft-magnetic and magnetostrictive measurement layer is arranged which is coaxial with respect to the shaft when the measurement layer support is fitted. A measurement coil support is provided and is fitted with a measurement coil that produces an electrical output signal as a function of a mechanical stress state of the measurement layer, the measurement coil being coaxially opposite the surface of the measurement layer. A holder on which the measurement coil support is fixed without being supported on the measurement layer support is also provided. The axial structural length of the measurement layer support substantially corresponds to the axial extent of the measurement layer, and the second end region of the measurement layer support is located in the axial region occupied by the measurement layer.

The sensor of the present invention can be manufactured with a very short axial structural length and its measurement coil support can be replaced easily since it is not mechanically coupled to the measurement surface support. There is no need for any ball bearing between the measurement coil support and the measurement surface support. Nevertheless, the sensor is mechanically robust and is especially advantageous in a rugged physical and chemical environment. The sensor principle enables the use of a simple electronics unit which detects the changes in the coil inductance. In addition to nickel as a component, the measurement layer of the present invention contains in certain embodiment a phosphorus addition and, in certain preferred embodiments, small components of a further element in the main group IV or V, especially antimony, as well as a transition metal, especially cobalt. The components of the elements in the main group IV or V in this case produces a considerable increase in the electrical resistivity as a result of the high component of atom bonds, so that particularly efficient damping of eddy currents is provided for the measurement layer. The transition metal component produces an increase in the crystallization temperature of the measurement layer and in the Curie temperature of nickel to a value of more than 700 Kelvin in each case. An electrolyte which is used to produce the measurement layer contains a compound, such as saccharin for example, which influences inherent stress. It has been found that such an addition of saccharin influences the inherent stress of the measurement layer in a favorable manner and thus contributes to increasing the magneto-elasticity.

In certain advantageous embodiments of the invention, the measurement coil is looped into a circuit which detects its inductance, the measurement coil at the same time representing the element which produces magnetic fields and measures the magnetic field, so that no further magnetic fields producing elements need be provided.

Particularly advantageous embodiments provide that the axial structural length of the overall sensor arrangement is essentially only as large as the width of the measurement layer. A positive influence on the measurement accuracy is provided by certain embodiments in which the reference layer allows all those changes in the reference layer to be detected which are not governed by torque, because the sleeve as a separate component is not, as a function of the design, subject to the power flow of the torque transmission, so that these influences which are not governed by the torque can be extracted from the measurement coil signal. Since, in addition, the reference coil is arranged coaxially with respect to the measurement coil, the axial structural length in not increased by this measure.

When the reference coil is provided, this reference coil is preferably insulated electrically and magnetically from the measurement coil by the sequence of three layers provided in certain embodiments, in order to prevent the two coils influencing one another in an interfering manner.

In certain embodiments of the composition of the measurements layer, an electrolyte which is used for producing the measurement layer contains compounds such as saccharin, for example, which influence the inherent stress. It has been found that such an addition of saccharin influences the inherent stress of the measurement layer in a favorable manner and thus contributes to increasing the magnetoelasticity.

Other objects, advantages and novel features of the present invention will become apparent from the following detailed description of the invention when considered in conjunction with the accompanying drawings.

DETAILED DESCRIPTION OF THE DRAWINGS

Figure 1:
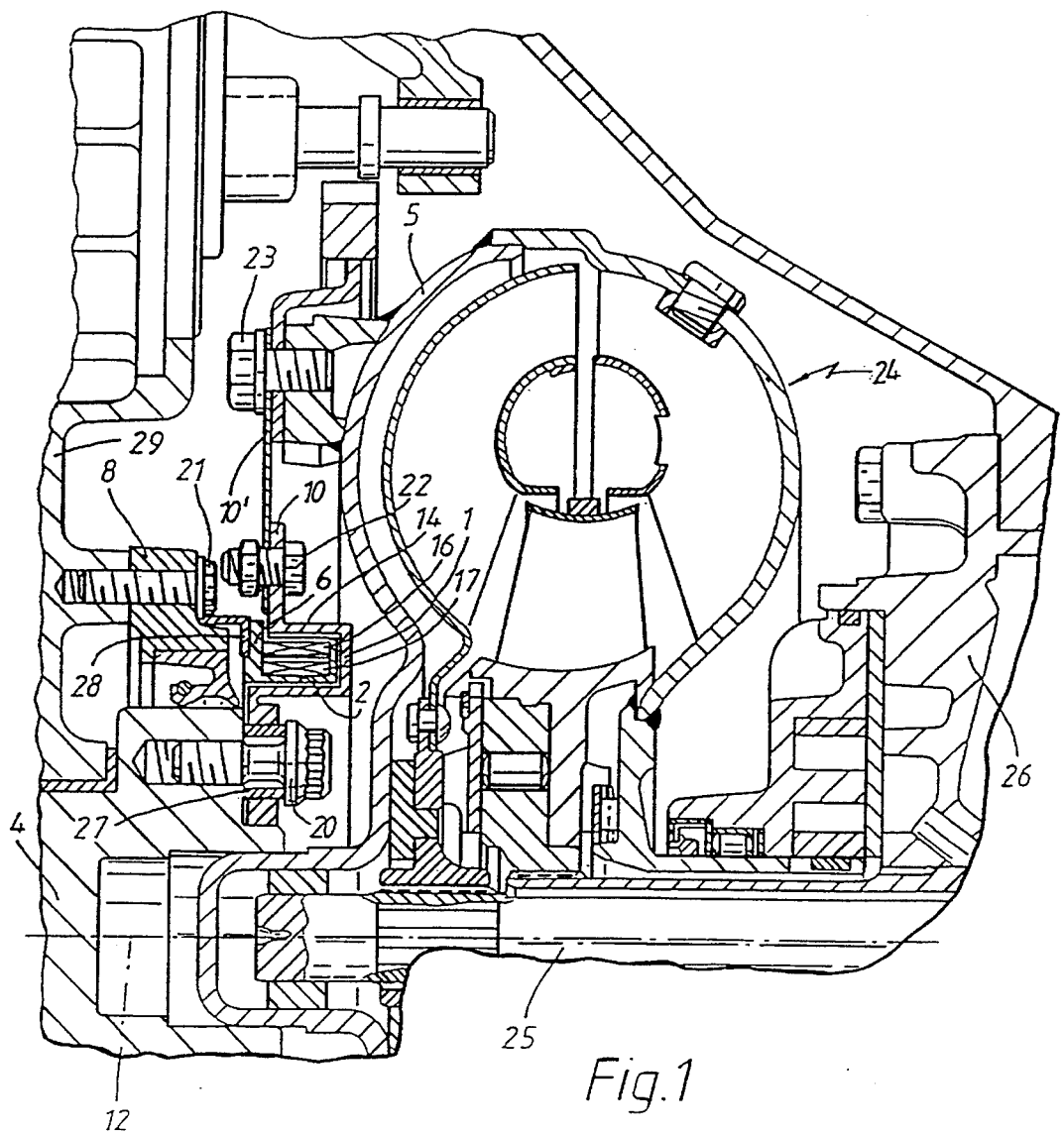
FIG. 1 shows a detail of half a longitudinal section through a region on the input side of a 4-gear automatic transmission of a motor vehicle having a torque sensor, constructed in accordance with an embodiment of the present invention.

FIG. 1 shows the transition between one end of a crankshaft (4) to which an engine torque can be applied and an associated connecting region (26) of the automatic transmission. A hydrodynamic converter (24) is arranged in a conventional manner, which will not be described in more detail here, between the crankshaft (4) and the associated transmission connection (26). A torque sensor whose essential elements can be seen more clearly in the detailed view in FIG. 2 is arranged between the crank shaft (4) and the half (5) of the hydrodynamic converter (24) on the pump impeller side.

Figure 2:
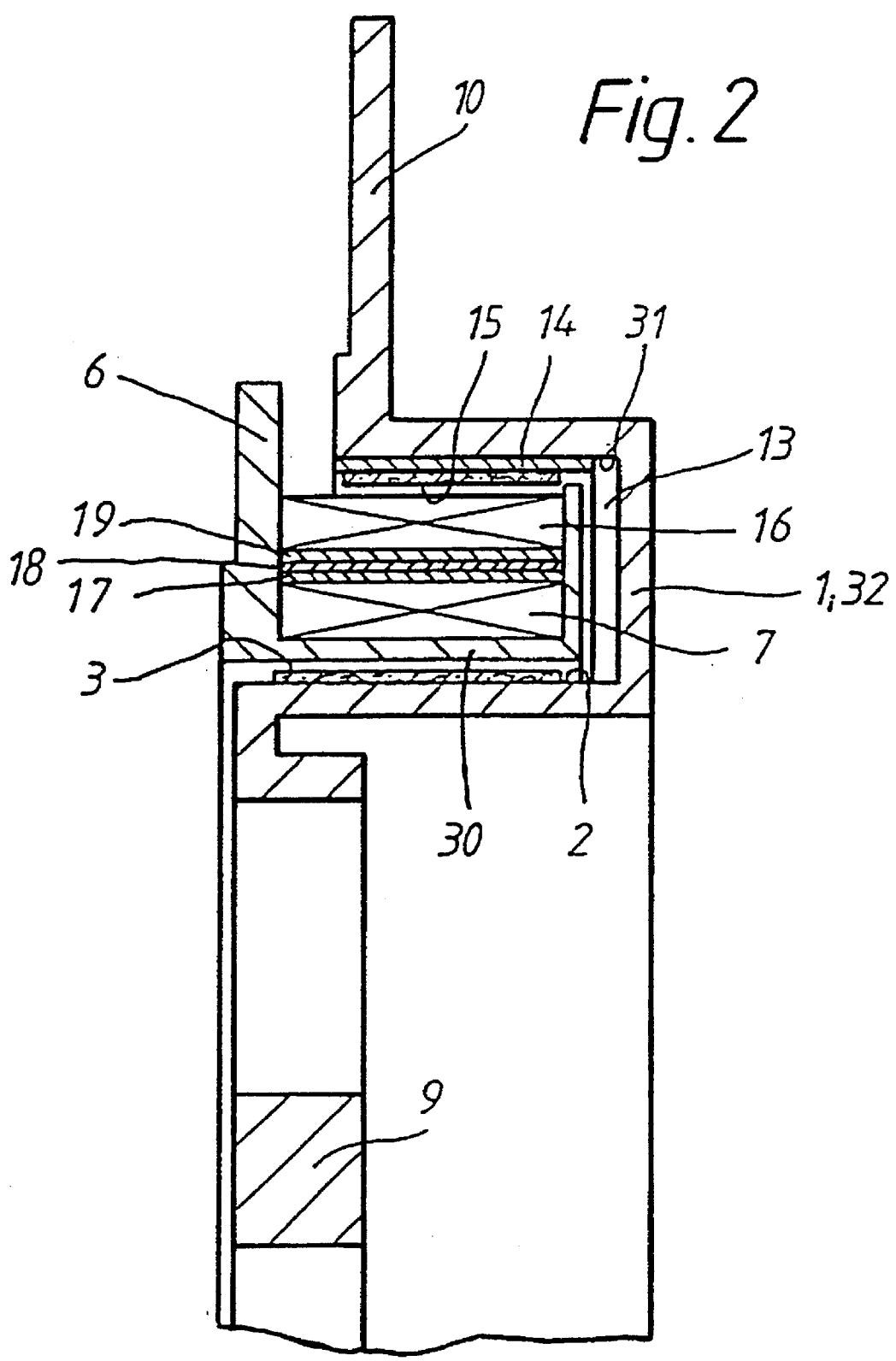
FIG. 2 shows half a longitudinal section through the torque sensor used in FIG. 1.

As can be seen in FIGS. 1 and 2, the sensor contains a measurement layer support (1) made of a non-magnetic material, which is constructed in the form of an annular disc and whose first, radially inner annular end region (9) is fixed by screw connections (20), via a spacer ring (27) in each case, on the end of the crank shaft (4), centered with respect to the crankshaft axis (12). The crankshaft axis (12) is identical to the transmission axis (25). A measurement layer support annular region (32) which has a U-shaped cross-section and by which an indentation (13) in the form of a cylindrical ring is defined is adjacent to this radially inner end region (9). Adjacent to this region (32) on the other side is a radially outwardly running second end region (10, 10') of the measurement layer support (1), a part (10) which is integral with the U-shaped annular region (32) ending as a radially running outer flange (10) whose radially inner edge region overlaps an outer annular disc (10') which continues the outer flange (10) radially outwards, and is connected thereto in a force-fitting manner in the overlapping region by screw connections (22). Provided on the radially outer edge region of the annular disc (10') are screw connections (23) which fix the annular disc (10') on the drive-side pump impeller half (5) of the hydrodynamic converter (24). The measurement layer support (1), which is constructed in two parts by these measures, in this way forms a driver disc via which the crankshaft torque can be transmitted to the pump impeller half (5) of the hydrodynamic converter (24). As can be seen, the measurement layer support (1) which forms this driver disc extends essentially in the plane at right angles to the crankshaft axis (12) so that, for example, the screw connections (20) for radially inner fixing of the measurement layer support (1) on the crank shaft (4), on the one hand, and the radially outer screw connections (23) for fixing the measurement layer support (1) on the hydrodynamic converter (24) are located essentially at the same axial height.

As can be seen, the axial structural depth of the overall sensor arrangement is essentially governed by the depth of the U-shaped indentation, and is thus very small. The torque power flow passes from the crankshaft (4) into the radially inner end region (9) of the measurement layer support (1) in said measurement layer support (1) radially outwards to the radially outer end of the second, radially outer end region (10, 10') of the measurement layer support (1). From there, the torque power flow continues to the drive-side pump impeller half (5) of the hydrodynamic converter (24) and, in the normal manner, onto the transmission input side (26).

The following text describes in more detail the construction of the sensor for torque detection, with special reference to FIG. 2.

The radially inner side wall (2) of the measurement layer support indentation (13), which is in the form of a U-shaped ring, is coated with a soft-magnetic, magnetostrictive measurement layer (3) in the form of an annular cylinder, so that the measurement layer (3) is located coaxially with respect to the crankshaft axis (12) when the sensor is fitted. If a magnetic material is selected for the measurement layer support (1), the measurement layer must be magnetically insulated from it, for example by the interposition of a first highly permeable non-magnetostrictive, amorphous layer and a second highly non-magnetic layer. The torque sensor furthermore contains a measurement coil (7) which is held on a measurement coil support (6) which, for its part, as is shown in FIG. 1, is fastened via a holder (28), by means of screw connections (21), on the facing end (8) of a crankshaft housing (29). The measurement coil support (6) forms an annular-cylindrical holder which corresponds to the measurement layer support indentation (13) which is in the form of a U-shaped ring, and has a radially inner cylindrical base surface (30) on which the measurement coil (7) is seated. The sensor arrangement is fitted such that the annular cylindrical holder for the measurement coil support (6) is inserted into the measurement layer support indentation (13), the measurement coil (7) coaxially surrounding the opposite measurement layer (3), leaving an air gap.

The measurement coil (7) at the same time forms that element which produces magnetic fields and detects magnetic field changes, and is for this purpose connected in a manner which is not shown to an electric circuit which measures its inductance. If a torque is now transmitted from the crankshaft (4), via the measurement layer support (1), to the hydrodynamic converter (24) and hence to the transmission (26), as a result of the torque power flow, this also results in a change in the mechanical stress state of the radially inner side annular wall (2) of the measurement layer support indentation (13) and, in consequence, of the magnetostrictive measurement layer (3) supported by it. When current flows through the measurement coil (7), then the permeability, which changes as a function of the changes in the mechanical stress state, of the soft-magnetic and magnetostrictive measurement layer (3) opposite it causes a change in the inductance of the measurement coil (7). This change is measured and evaluated by an evaluation unit which is not shown but is likewise connected to the electrical circuit of the measurement coil (7), as a result of which the crankshaft torque is determined without any contact, using a suitable electrical signal.

In order to eliminate possible changes which are not dependent on the torque, the sensor arrangement furthermore has a reference part with a reference coil (16) and a reference layer (15). The reference coil (16) is wound coaxially over the measurement coil (7) within the cylindrical holder of the measurement coil support (6). Three thin cylindrical layers (17, 18, 19) are in this case interposed for electrical and magnetic insulation, to be precise firstly a radially inner electrical insulation layer (17), followed by a jacket (18) composed of soft-magnetic, non-magnetostrictive material which magnetically screens the coils (7, 16) against the magnetic field of the other coil respectively, and finally a second, radially outer electrical insulation layer (19). Adjacent to the radially outer, side annular wall (31) of the measurement layer support indentation (13), a sleeve (14) is interposed as a separate part, which is composed of non-magnetic material and, for its part, is fitted internally with a cylindrical reference layer (15) having the same composition and the same properties as the measurement layer (3). When the sensor arrangement is fitted, this reference layer (15) surrounds the reference coil (16) at a short distance but without touching it and leaving an air gap, the inductance of this reference coil (16) being detected in the same way as that of the measurement coil (7).

Interposing the sleeve (14), which is fitted with a reference layer (15), as a separate component has the consequence that this sleeve (14) and hence also the reference layer (15) are not subject to the influence of the crankshaft torque to be transmitted. In consequence, the reference coil (16) detects all those changes in the reference layer (15) which are not governed by the torque and also act on the measurement layer (3). The reference measurement from the reference coil (16) can in consequence be used to compensate for a thermal zero change and sensitivity change. For evaluation, the measurement coil (7) and the reference coil (16) are preferably connected to form an inductive half bridge. An elegant embodiment of evaluating torque-analogue changes in the inductive half bridge electronically is achieved, for example, by using the AD598 integrated circuit from the ANALOG DEVICES Company.

As can be seen, because of its very short axial structural length, the sensor arrangement of the present invention requires no significant additional axial space for installation in the automatic transmission. In addition, the sensor described above at the same time carries out the function of a driver disc for coupling the crankshaft to the hydrodynamic converter for the automatic transmission.

Since the measurement coil support (6) is not mechanically connected to the measurement layer support (1), parts of the sensor arrangement can be replaced in a simple manner if necessary. No additional axial measurement shaft piece and, in addition, no costly ball bearing between the measurement coil support and the measurement layer support are required for this torque sensor, by virtue of the design. Nevertheless, the arrangement is mechanically robust and is designed such that any axial crankshaft play has no influence on the measurement.

Other embodiments, which are evident to the person skilled in the art and fall within the scope of the present invention, of the torque sensor described above are, of course, possible. Thus, for example, the outer annular disc (10') can be constructed integrally with the rest of the measurement layer support (1). Further design adaptations which can be carried out depending on the specified requirements allow a torque sensor of the type described above also to be used for other types of automatic transmissions for very different types of vehicles and for other application possibilities in which the torque on a shaft is intended to be detected. The described torque sensor arrangement is also suitable for use in a rugged physical and chemical environment, and allows the use of an inductance measuring electronics unit of simple construction.

Layers composed of an amorphous, soft-magnetic and magnetostrictive material having a novel chemical composition which is explained in more detail in the following text are used as the reference layer and measurement layer in certain preferred embodiments.

The amorphous measurement layer and the identical reference layer (3, 15) consist mainly of nickel, between 0% by weight and 8% by weight of phosphorus, preferably between 0% by weight and 3% by weight of phosphorus, between 0% by weight and 2% by weight of antimony, and between 0% by weight and 5% by weight of cobalt being added. The inherent stresses of the layer (13, 15) are favorably influenced by the addition of compounds, such as saccharin for example, which influence the inherent stress into the production electrolyte bath. The remaining component which in each case makes up 100% by weight is formed by the main component of nickel. It should be mentioned that, using each intermediate value for the content ranges of each component specified above, a material combination is implemented which results in a usable measurement layer and reference layer. In addition, it is possible to use a different transition metal, for example iron, instead of cobalt. Moreover, a different element in main group IV or V of the periodic table, for example lead, can be used instead of antimony.

The transition metal, in this case cobalt, produces an increase in the crystallization temperature of the layer and in the Curie temperature of nickel to a value of in each case more than 700K.

The element in the main group IV or V, in this case antimony or, for example, lead, produces a considerable increase in the electrical resistivity as a result of the high component of atom bonds, so that any eddy currents which may occur are damped particularly efficiently.

The phosphorus addition governs the amorphicity and the magnetic isotropy of the layer and thus its soft magnetic properties, a phosphorus component of more than 3% by weight leading to a reduction in the ferromagnetism and thus in the magnetostrictive effect.

It has additionally been shown that the addition of saccharin has a favorable influence on the inherent stress of the layer and thus contributes to the increase in the magnetoelasticity.

From the above components, the measurement layer may have a composition in accordance with the chemical formula $A_{1-x}B_x$, A being a quantity of preferably two ferromagnetic transition metals M1 and M2, and B being a quantity of metalloids m1 and m2. In this case, M1 may be the element nickel and M2 the element cobalt, while m1 is Δ the element P and m2 the element tin. A possible quantity ratio is $(M1_{0.9}, M2_{0.1})_{0.8}(m1_{0.5}, m2_{0.5})_{0.2}$. In this case, the magnetostriction constant is fundamentally influenced by the layer composition. If the quantity ratio M1:M2 is varied continuously from 9:1 to 1:9, the magnetostriction constant changes from a negative mathematical sign to a positive mathematical sign, passing through a point of minimum magnetostriction at a quantity ratio of approximately 1:1.

The measurement layer and the reference layer can be applied onto the measurement layer support (1) by atomic growth, for example by chemical surface reduction, electrolytic deposition, a PVD or CVD procession implantation or combinations and variations of the said processes, for example using ultrasound, a laser or a plasma and the like. Alternatively, it is possible to produce the component to be solid from amorphous material by means of mechanical alloying of the components.

After this growth process, a thin protective film having a higher phosphorus content, of more than 8% by weight of phosphorus, is applied for mechanical and chemical protection of the measurement layer and reference layer (3, 15).

It is self-evident that the soft-magnetic and magnetostrictive, amorphous measurement layer described here can also be used in torque sensors other than that described above.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Sensor for non-contact torque measurement on a shaft comprising:

a measurement layer support, which has a first end region for torque-coupled fixing on a shaft, and a second end region which is an annular disc and extends essentially at right angles to an axis of the shaft when the measurement layer support is fitted;

a downstream element and a cylindrical surface torque-coupled fixed between the first and second end regions, on which cylindrical surface a soft-magnetic and magnetostrictive measurement layer is arranged which is coaxial with respect to the shaft when the measurement layer support is fitted;

a measurement coil support, fitted with a measurement coil that produces an electrical output signal as a function of a mechanical stress state of the measurement layer, the measurement coil being coaxially opposite the surface of the measurement layer; and a holder on which the measurement coil support is fixed without being supported on the measurement layer support;

wherein the axial structural length of the measurement layer support substantially corresponds to the axial extent of the measurement layer, and the second end region of the measurement layer support is located in the axial region occupied by the measurement layer.

2. Torque sensor according to claim 1, wherein the measurement coil is simultaneously an element which produces magnetic fields and measures the magnetic field and is looped into a circuit which detects its inductance.

3. Torque sensor according to claim 2, wherein the first end region is an inner annular disc region, and the second end region is an outer annular disc region, and between the first and second annular disc regions, the measurement layer support has an annular indentation which has a U-shaped cross-section and into which the measurement coil is inserted, the measurement layer being arranged on that side wall of the indentation which is opposite the measurement coil.

4. Torque sensor according to claim 3, further comprising a sleeve composed of non-magnetic material inserted into the indentation, running along an outer side wall of the indentation which is opposite the measurement layer; a soft-magnetic and magnetostrictive reference layer arranged on an inner surface of the sleeve; and a reference coil which is opposite the reference layer and is fitted on the measurement coil support, coaxially with respect to the measurement coil, and is electrically and magnetically insulated from said measurement coil.

5. Torque sensor according to claim 4, further comprising an inner electrical insulation layer, a jacket composed of soft-magnetic material and an outer electrical insulation layer that are arranged, coaxially on top of one another, between the measurement coil and the reference coil and providing electrical and magnetic insulation.

\* \* \* \* \*